(12) United States Patent
Kent

(10) Patent No.: US 8,929,197 B2
(45) Date of Patent: *Jan. 6, 2015

(54) METHOD AND SYSTEM FOR AN OFDM JOINT TRAINING AND FREQUENCY TRACKING SYSTEM

(71) Applicant: Broadcom Corporation, Irvine, CA (US)

(72) Inventor: Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/035,713

(22) Filed: Sep. 24, 2013

(65) Prior Publication Data

US 2014/0023162 A1 Jan. 23, 2014

Related U.S. Application Data

(63) Continuation of application No. 12/184,353, filed on Aug. 1, 2008, now Pat. No. 8,559,296.

(51) Int. Cl.
*H04J 11/00* (2006.01)
*H04L 27/26* (2006.01)

(52) U.S. Cl.
CPC .......... *H04L 27/265* (2013.01); *H04L 27/2675* (2013.01); *H04L 27/2649* (2013.01); *H04L 27/2662* (2013.01); *H04L 27/2657* (2013.01)
USPC ............................ 370/208; 370/210; 370/503

(58) Field of Classification Search
USPC ......... 370/203–204, 206, 208–210, 252, 330, 370/336, 503, 516
See application file for complete search history.

(56) References Cited

U.S. PATENT DOCUMENTS 4,879,728 A 11/1989 Tarallo
5,287,388 A 2/1994 Ogura et al.
(Continued)

FOREIGN PATENT DOCUMENTS

EP 2 079 178 7/2009
KR 20050039263 4/2005
WO WO-2008/053889 5/2008

OTHER PUBLICATIONS

Santella, G., "A Frequency and Symbol Synchronization System for OFDM Signals: Architecture and Simulation Results," *IEEE Transactions on Vehicular Technology* 49:254-275, Rome, Italy (Jan. 2000).

(Continued)

*Primary Examiner* — Kevin Mew
(74) *Attorney, Agent, or Firm* — Sterne, Kessler, Goldstein & Fox P.L.L.C.

(57) ABSTRACT

Aspects of a method and system for an OFDM joint timing and frequency tracking system may include tracking carrier frequency and symbol timing in an Orthogonal Frequency Division Multiplexing (OFDM) signal based on at least a reference symbol set. A receiver frequency and timing may be adjusted based on the tracked carrier frequency and symbol timing. The carrier frequency may be tracked by generating an output signal as a function of a frequency offset $\Delta f$, and the symbol timing may be tracked by generating an output signal as a function of a guard time $\Delta t_g$. The received OFDM signal may be fast Fourier transformed to generate the reference symbol (RS) set. The receiver frequency and timing may be adjusted coarsely prior to fine adjustment. The coarse receiver frequency and the timing adjustment may be based on processing a primary synchronization signal and a secondary synchronization signal.

20 Claims, 5 Drawing Sheets

(56) References Cited

U.S. PATENT DOCUMENTS

| | | | |
|---|---|---|---|
| 5,463,403 | A | 10/1995 | Walker et al. |
| 5,790,784 | A | 8/1998 | Beale et al. |
| 6,289,061 | B1 | 9/2001 | Kandala et al. |
| 6,449,246 | B1 | 9/2002 | Barton et al. |
| 6,985,432 | B1 | 1/2006 | Hadad |
| 7,218,691 | B1 | 5/2007 | Narasimhan |
| 7,248,652 | B2 | 7/2007 | Sayeed |
| 7,251,283 | B2 | 7/2007 | Chen |
| 7,457,231 | B2 | 11/2008 | Vijayan et al. |
| 7,539,125 | B2 | 5/2009 | Kao et al. |
| 7,710,858 | B1 * | 5/2010 | Cohen .................. 370/210 |
| 7,729,462 | B2 | 6/2010 | Ma et al. |
| 7,957,265 | B2 * | 6/2011 | Geile et al. ............ 370/210 |
| 7,957,476 | B2 * | 6/2011 | Sanada et al. .......... 375/260 |
| 8,416,733 | B2 * | 4/2013 | Srinivasan et al. ...... 370/324 |
| 8,559,296 | B2 * | 10/2013 | Kent ...................... 370/208 |
| 2002/0097669 | A1 | 7/2002 | Kim |
| 2002/0119763 | A1 | 8/2002 | Ramachandran et al. |
| 2003/0112743 | A1 * | 6/2003 | You et al. ............... 370/203 |
| 2004/0081205 | A1 | 4/2004 | Coulson |
| 2004/0228272 | A1 | 11/2004 | Hasegawa et al. |
| 2005/0152403 | A1 | 7/2005 | Horisaki |
| 2005/0186956 | A1 | 8/2005 | Grindahl et al. |
| 2005/0213680 | A1 | 9/2005 | Atungsiri et al. |
| 2005/0249181 | A1 | 11/2005 | Vijayan et al. |
| 2005/0286485 | A1 | 12/2005 | Golden et al. |
| 2006/0114812 | A1 | 6/2006 | Kim et al. |
| 2006/0221810 | A1 | 10/2006 | Vrcelj et al. |
| 2006/0245349 | A1 * | 11/2006 | Vrcelj et al. .......... 370/210 |
| 2006/0256894 | A1 | 11/2006 | Kim |
| 2007/0183514 | A1 | 8/2007 | Iancu et al. |
| 2008/0088082 | A1 | 4/2008 | Iino et al. |
| 2008/0152018 | A1 | 6/2008 | Ma et al. |
| 2008/0170645 | A1 | 7/2008 | Kleider et al. |
| 2009/0154575 | A1 | 6/2009 | Rofougaran |
| 2009/0180466 | A1 | 7/2009 | Soul et al. |
| 2009/0207865 | A1 | 8/2009 | Yonge et al. |
| 2009/0245214 | A1 | 10/2009 | Mudulodu et al. |
| 2009/0285269 | A1 | 11/2009 | Zhang et al. |

OTHER PUBLICATIONS

Communication pursuant to Article 94(3) EPO dated May 8, 2013.

Tanno et al.; "Physical Channel Structures and Cell Search Method for Scalable Bandwidth for OFDM Radio Access in Evolved UTRA Downlink." IEICE Transactions on Communications, vol. E90B, No. 12, Dec. 2007, XP001509847.

European Search Report for European Patent Application No. 09009039.0-2415, dated Dec. 17, 2009.

Office Action for related Taiwanese Patent Application No. 098125936, mailed Feb. 14, 2014; 8 pages.

* cited by examiner

METHOD AND SYSTEM FOR AN OFDM JOINT TRAINING AND FREQUENCY TRACKING SYSTEM

CROSS-REFERENCE TO RELATED APPLICATIONS/INCORPORATION BY REFERENCE

This patent application claims the benefit of U.S. patent application Ser. No. 12/184,353, filed Aug. 1, 2008, entitled "Method and System for an OFDM Joint Timing and Frequency Tracking System" which is incorporated herein by reference in its entirety.

This patent application makes reference to U.S. application Ser. No. 12/184,383 (now U.S. Pat. No. 8,174,958), filed on Aug. 1, 2008; and U.S. application Ser. No. 12/184,410 (now U.S. Pat. No. 8,223,891), filed on Aug. 1, 2008, each of which is incorporated herein by reference in its entirety.

FIELD OF THE INVENTION

Certain embodiments of the invention relate to signal processing for communication systems. More specifically, certain embodiments of the invention relate to a method and system for an OFDM joint timing and frequency tracking system.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communications data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for an OFDM joint timing and frequency tracking system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an OFDM joint timing and frequency tracking system. Aspects of the method and system for an OFDM joint timing and frequency tracking system may comprise tracking carrier frequency and symbol timing in an Orthogonal Frequency Division Multiplexing (OFDM) signal based on at least a reference symbol set. A receiver frequency and timing may be adjusted based on the tracked carrier frequency and symbol timing.

The carrier frequency may be tracked by generating an output signal that is a function of a frequency offset $\Delta f$, and the symbol timing may be tracked by generating an output signal that is a function of a guard time $\Delta t_g$. The received OFDM signal may be fast Fourier transformed to generate the reference symbol (RS) set. The receiver frequency and timing may be adjusted coarsely prior to fine adjustment. The coarse receiver frequency and the timing adjustment may be based on processing a primary synchronization signal and a secondary synchronization signal. The reference symbol set may comprise a plurality of time-frequency slots, which may change according to a time-frequency shift and PN sequence that may modulate the reference symbols. The PN generated sequences may be determined by base station identifier. This base station identifier may be determined by the primary synchronization signal (PSS) and secondary synchronization signal (SSS). The OFDM signal may conform to a Universal Mobile Telecommunications Standards (UMTS) long-term evolution (LTE) signal. The adjustment of the receiver frequency may be controlled via a receiver frequency oscillator (TXCO), and the adjustment of the timing may be controlled via a timing generator.

Figure 1A:
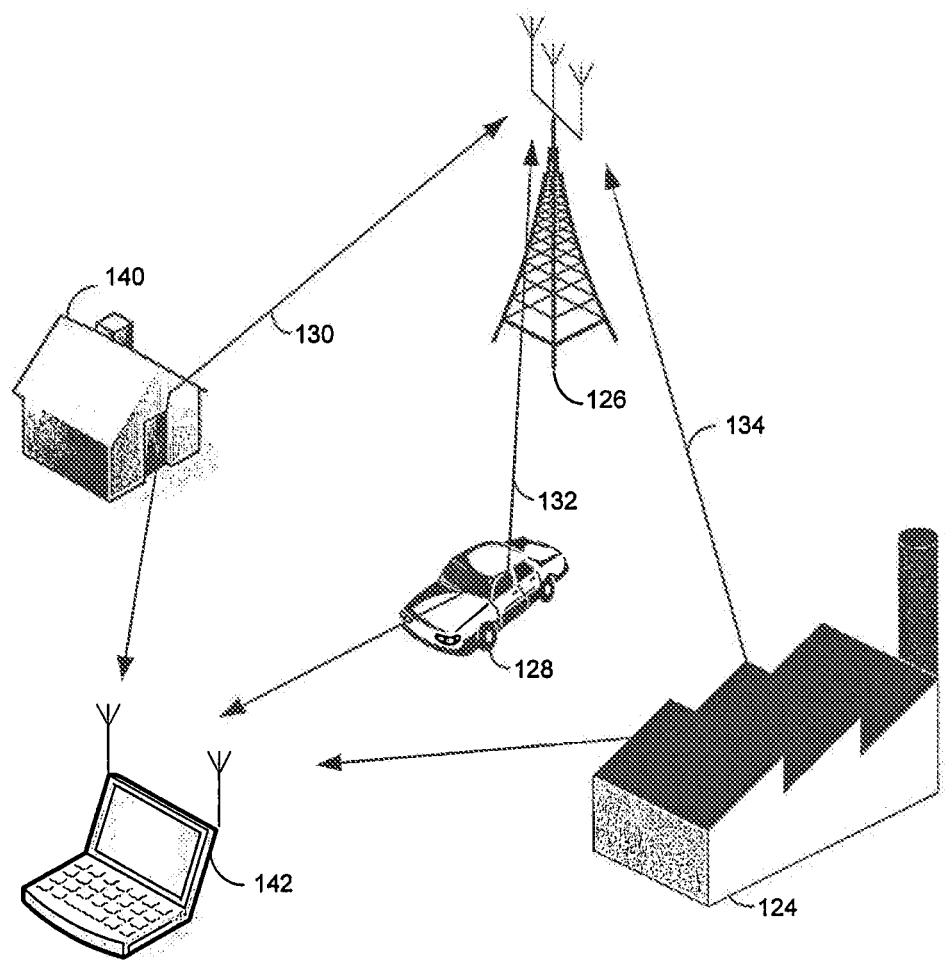
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a building 140 such as a home or office, a mobile terminal 142, a factory 124, a base station 126, a car 128, and communication paths 130, 132 and 134.

The base station 126 and the mobile terminal 142 may comprise suitable logic, circuitry and/or code that may be enabled to generate and process MIMO communication signals.

Wireless communications between the base station 126 and the mobile terminal 142 may take place over a wireless channel. The wireless channel may comprise a plurality of communication paths, for example, the communication paths 130, 132 and 134. The wireless channel may change dynamically as the mobile terminal 142 and/or the car 128 moves. In some cases, the mobile terminal 142 may be in line-of-sight (LOS) of the base station 126. In other instances, there may not be a direct line-of-sight between the mobile terminal 142 and the base station 126 and the radio signals may travel as reflected communication paths between the communicating entities, as illustrated by the exemplary communication paths 130, 132 and 134. The radio signals may be reflected by man-made structures like the building 140, the factory 124 or the car 128, or by natural obstacles like hills. Such a system may be referred to as a non-line-of-sight (NLOS) communications system.

Signals communicated by the communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 142. The communication paths 130, 132 and 134 may also be differently attenuated. In the downlink, for example, the received signal at the mobile terminal 142 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 142, in particular for NLOS communication systems. Furthermore, Orthogonal Frequency Division Multiplexing (OFDM) systems may be suitable for wireless systems with multipath.

Figure 1B:
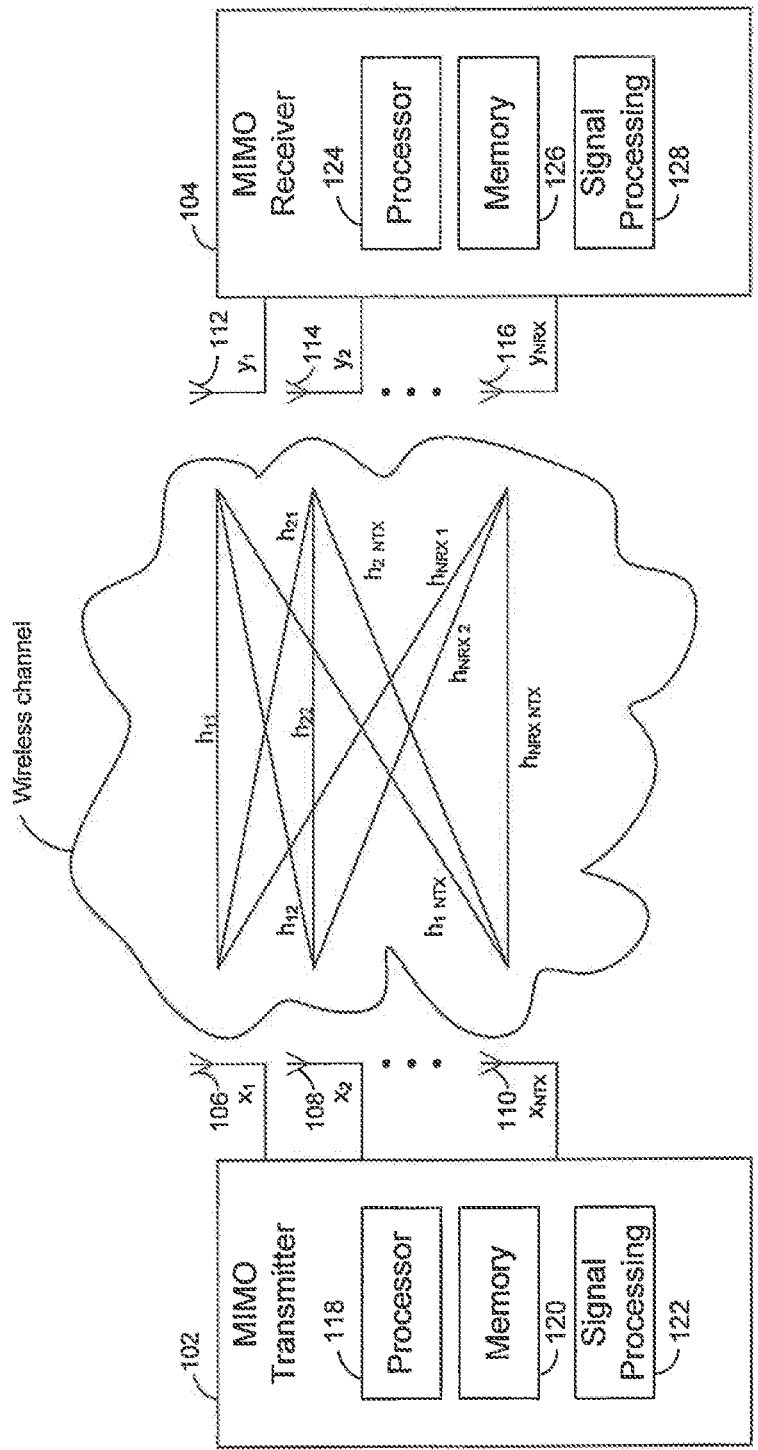
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. The MIMO transmitter 102 may comprise a processor block 118, a memory block 120, and a signal processing block 122. The MIMO receiver 104 may comprise a processor block 124, a memory block 126, and a signal processing block 128. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$, i∈{1,2, ... $N_{TX}$} that may be transmitted by the transmit antennas, of which the antennas 106, 108 and 110 may be depicted in FIG. 1B. The processor block 118 may comprise suitable logic, circuitry, and/or code that may be enabled to process signals. The memory block 120 may comprise suitable logic, circuitry, and/or code that may be enabled to store and/or retrieve information for processing in the MIMO transmitter 102. The signal processing block 122 may comprise suitable logic, circuitry and/or code that may be enabled to process signals, for example in accordance with one or more MIMO transmission protocols. The MIMO receiver 104 may comprise suitable logic, circuitry and/or code that may be enabled to process the receive symbols $y_i$, i∈{1,2, ... $N_{RX}$} that may be received by the receive antennas, of which the antennas 112, 114 and 116 may be shown in FIG. 1B. The processor block 124 may comprise suitable logic, circuitry, and/or code that may be enabled to process signals. The memory block 126 may comprise suitable logic, circuitry, and/or code that may be enabled to store and/or retrieve information for processing in the MIMO receiver 104. The signal processing block 128 may comprise suitable logic, circuitry and/or code that may be enabled to process signals, for example in accordance with one or more MIMO protocols. An input-output relationship between the transmitted and the received signal in a MIMO system may be specified as:

$$y = Hx + n$$

where $y=[y_1, y_2, \ldots y_{NRX}]^T$ may be a column vector with $N_{RX}$ elements, $^T$ may denote a vector transpose, $H=[h_{ij}]$: i∈{1, 2, ... $N_{RX}$}; j∈{1,2, ... $N_{TX}$} may be a channel matrix of dimensions $N_{RX}$ by $N_{TX}$, $x=[x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunication System (UMTS) Long-Term Evolution (LTE) system. Over each of the $N_{TX}$ transmit antennas, a symbol stream, for example $x_1(t)$ over antenna 106, may be transmitted. A symbol stream, for example $x_1(t)$, may comprise one or more symbols, wherein each symbol may be modulated onto a different sub-carrier. OFDM systems may generally use a relatively large number of subcarriers in parallel, for each symbol stream. For example, a symbol stream $x_1(t)$ may comprise symbols on carriers $f_m$: m∈{1,2, ... M}, and M may be a subset of the FFT size that may be utilized at the receiver. For instance, with FFT sizes of N, N>M and may create guard-tones that may allow utilization of variable bandwidth when deployed., for example, 64, 128, or 512 sub-carriers, The M sub-carriers may comprise a symbol stream $x_1(t)$, for example, that may occupy a bandwidth of a few kilohertz to a few megahertz. Common bandwidth may be between 1 MHz and up to 100 MHz, for example. Thus, each symbol stream may comprise one or more sub-carriers, and for each sub-carrier a wireless channel may comprise multiple transmission paths. For example, a wireless channel $h_{12}$ from transmit antenna 108 to receive antenna 112, as illustrated in the figure, may be multi-dimensional. In particular, the wireless channel $h_{12}$ may comprise a temporal impulse response, comprising one or more multipath components. The wireless channel $h_{12}$ may also comprise a different temporal impulse response for each sub-carrier $f_m$ of the symbol stream, for example $x_2(t)$ The wireless channels as illustrated in FIG. 1B depict a spatial dimension of the wireless channel because the transmitted signal from each transmit antenna may be received differently at each receiver antenna. Thus, a channel impulse response may be measured and/or estimated for each sub-carrier.

Figure 2:
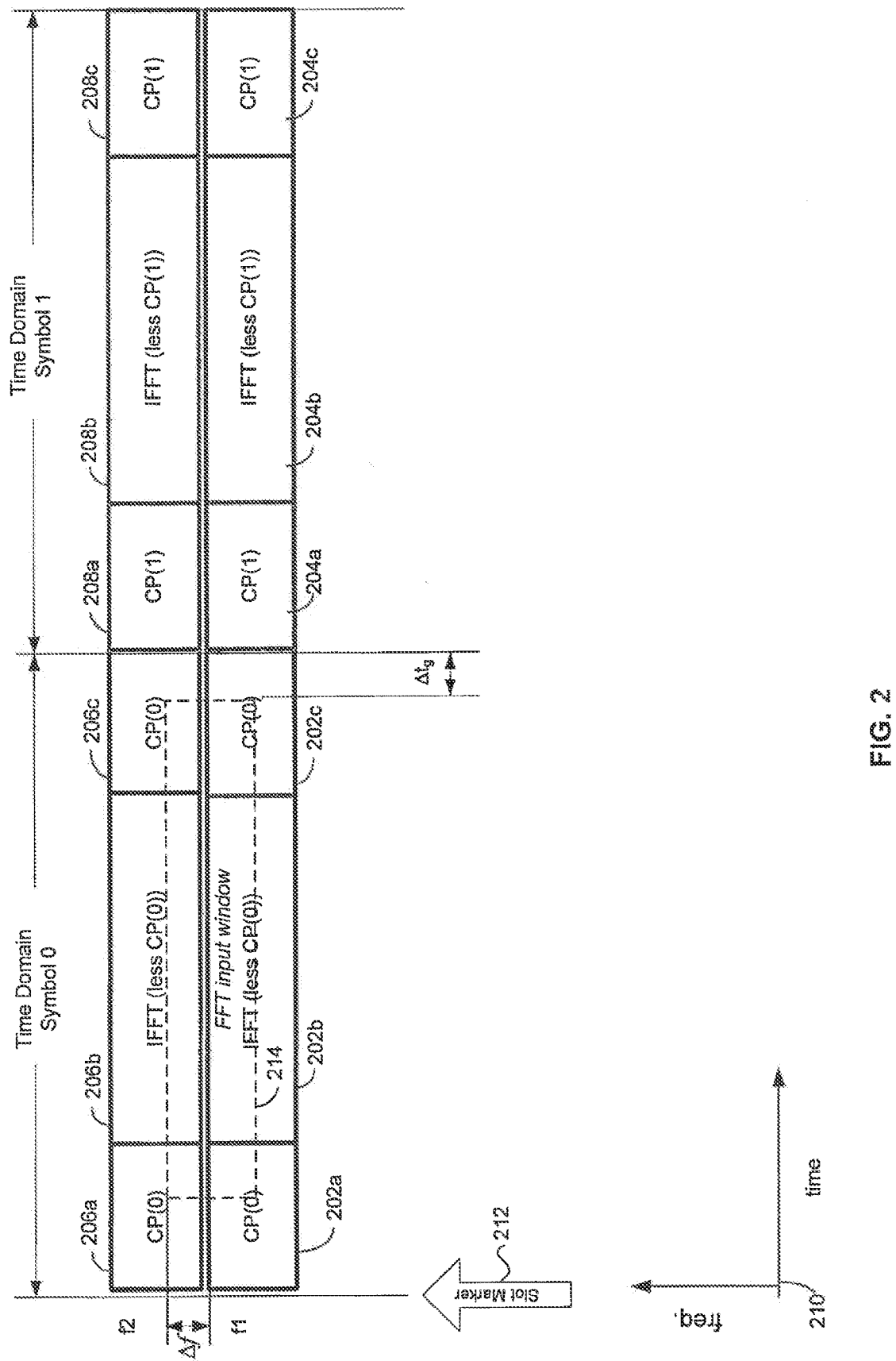
FIG. 2 is a diagram illustrating an exemplary OFDM symbol stream, in accordance with an embodiment of the invention.

FIG. 2 is a diagram illustrating an exemplary OFDM symbol stream, in accordance with an embodiment of the invention. Referring to FIG. 2, there is shown time-frequency axes 210; a symbol 0 comprising a cyclic prefix CP(0) 202a, an Inverse Fast Fourier Transform (IFFT) symbol less CP(0) (IFFT(0)) 202b, and a cyclic prefix CP(0) 202c, at frequency f1; a symbol 1 comprising a cyclic prefix CP(1) 204a, an IFFT symbol less CP(1) (IFFT(0)) 204b, and a cyclic prefix CP(1) 204c, at frequency f1. The IFFT(0) 202b and the CP(0) 202c may together form a complete IFFT symbol for time domain symbol 0 at frequency f1. The CP(0) 202a may be substantially similar to CP(0) 202c. Similarly, the IFFT(1) 204b and the CP(1) 204c may together form a complete IFFT symbol for time domain symbol 1 at f1, and CP(1) 202a may be substantially similar to CP(1) 202c. Similarly, there is shown a symbol 0 comprising a cyclic prefix CP(0) 206a, an Inverse Fast Fourier Transform (IFFT) symbol less CP(0) (IFFT(0)) 206b, and a cyclic prefix CP(0) 206c, at frequency f2. There is also shown a symbol 1 comprising a cyclic prefix CP(1) 208a, an IFFT symbol less CP(1) (IFFT(0)) 208b, and a cyclic prefix CP(1) 208c, at frequency f2. There is also shown an FFT input window 214 (dashed line), a guard time $\Delta t_g$, a frequency offset $\Delta f$, and a slot marker 212. An LTE slot structure, for example, may comprise 3, 6, or 7 OFDM symbols per slot (two of which may be illustrated in FIG. 2) in the time domain.

To generate an Orthogonal Frequency Division Multiplexing (OFDM) symbol, an output of an IFFT comprising of IFFT(0) 202b and CP(0) 202c may be used to generate CP(0) 202a from CP(0) 202c, and append it to IFFT(0) 202b. The cyclic prefix CP(0) 202 may be utilized to avoid inter-symbol interference at an OFDM receiver, in the presence of multi-path propagation in the wireless channel.

At an OFDM receiver, for example MIMO receiver 104, a sampled input signal may be processed for each received symbol, for example over an FFT input window 214. In order to decode the received symbols, it may be desirable that the FFT input window 214 may be located in a time domain symbol time slot, for example in time domain symbol 0. In particular, it may be desirable that the FFT input window 214 may not extend into a neighboring symbol, to avoid inter-symbol interference. Furthermore, it may be desirable that the FFT input window 214 may not overlap multiple symbols in the frequency domain. Thus, the slot marker may indicate the beginning of a slot, for example time domain symbol slot 0, as illustrated in FIG. 2. The slot marker 208 together with $\Delta t_g$ may define the position of the FFT input window 214 within a symbol slot in the time domain. Similarly, a frequency carrier, for example f1 or f2, together with a frequency offset $\Delta f$ may determine the location of the FFT input window 214 in the frequency domain. In most instances, to keep interference due to the multipath channel as low as possible at the receiver, it may be desirable to keep $\Delta t_g$ and $\Delta f$ small.

Thus, it may be desirable to acquire frequency and timing information, and maintain frequency and timing tracking as they may drift, for example, because of changes in propagation due to mobility. In some instances, this may be combined with other frequency and timing acquisition and tracking processes. In many instances, coarse frequency and time synchronization may be achieved via the Primary Synchronization Signal (PSS) and the Secondary Synchronization Signal (SSS). Fine frequency and time tracking may be acquired by a frequency acquisition and tracking system, which may exploit reference signals (RS) embedded in an OFDM signal. Reference symbols may be known symbols that may be transmitted according to a known pattern over the time, frequency and spatial resources in an OFDM system. In other words, reference symbols may be transmitted at known timing instances, on known OFDM carriers over certain antennas. By decoding and processing PS symbols, the receiver may determine correct timing and frequency information, for example, through coherent demodulation. RS symbols may be transmitted from each antenna in a multiple antenna OFDM system.

In the Enhanced Universal Terrestrial Radio Access (EU-TRA) interface, RS symbols may be generated based on cell-specific hopping pattern, and comprise pseudo-noise (PN) covered sequences of Reference symbols. In accordance with an embodiment of the invention, the RS tone spacing may be 6 carriers, per transmit antenna, for example. In accordance with various embodiments of the invention, the RS tone spacing may be 2, or 4 carriers, for example. The RS sequence may not be known to the mobile terminal (user equipment, UE) during initial acquisition, for example through the synchronization signals. In some instances, after acquiring the primary synchronization signal (PSS) and the secondary synchronization signal (SSS), the UE may have obtained the cell-specific hopping pattern for the RS symbols, and the PN covering sequence. This information may be used to obtain coarse frequency and timing information. In accordance with various embodiments of the invention, the RS symbols may then be decoded in one or more frequency and timing acquisition and tracking block to provide fine frequency and time tracking.

Figure 3:
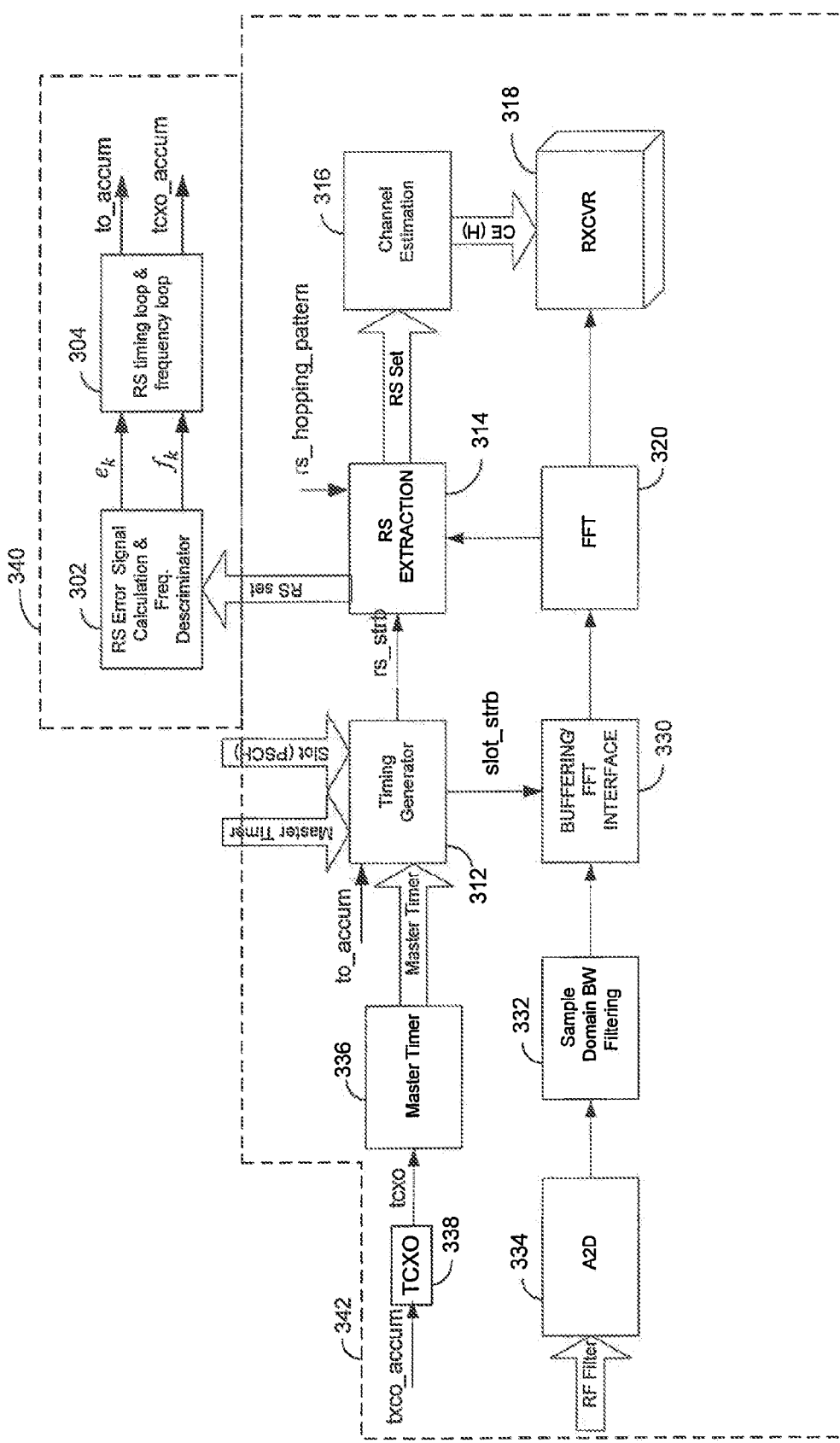
FIG. 3 is a diagram of an exemplary OFDM frequency and timing acquisition and tracking system, in accordance with an embodiment of the invention.

FIG. 3 is a diagram of an exemplary OFDM frequency and timing acquisition and tracking system, in accordance with an embodiment of the invention. Referring to FIG. 3, there is shown a common receiver part 342, and a frequency and timing part 340. The frequency and timing part 340 may comprise an RS error block 302, and an RS timing and frequency loop 304. There is also shown an RS set input, a frequency error signal $f_k$, a timing error signal $e_k$, an output signal txco_accum, and an output signal to_accum. The common receiver part 342 may comprise a timing generator 312, an RS extraction block 314, a channel estimation block 316, a receiver operations block (RXCVR) 318, a fast Fourier transform (FFT) block 320, a buffering block 330, a sampling bandwidth (BW) filter 332, an analog-to-digital block 334, a master timer 336. and a TCXO 338. There is also shown an RF filter input, a master timer output, a slot timing input from PSS, an RS set output, a txco_accum signal, a to—accum signal, an rs_strb signal, and a slot_strb signal.

The common receiver part 342 may comprise a timing generator 312, an RS extraction module or circuit 314, a channel estimation block 316, a receiver operations block (RXCVR) 318, a fast Fourier transform (FFT) block 320, a buffering block 330, a sampling bandwidth (BW) filter 332, an analog-to-digital block 334, a master timer 336, and a Temperature-Controlled crystal Oscillator (TCXO) 338. There is also shown an RF filter input, a master timer output, a slot timing input from PSS, an RS set output, a txco_accum signal, an rs_strb signal, and a slot_strb signal.

The frequency and timing part 340 may comprise suitable logic, circuitry and/or code that may be enabled to extract frequency and timing information from a received OFDM signal by processing an RS set of signals, which may generate an output txco_accum that may control the TCXO 338, for example. In addition, frequency and timing part 340 may be enabled to generate an output signal to_accum, which may be used to control system timing via the timing generator 312, for example. The RS error block 302 may comprise suitable logic, circuitry and/or code that may be enabled to track frequency and timing offsets, for example $\Delta f$ and $\Delta t_g$ as illustrated in FIG. 2.

The common receiver part 342 may comprise suitable logic, circuitry and/or code that may be enabled to receive radio frequency signals, and process these signals. Processing may comprise FFT computation, RS symbol extraction, channel estimation and other receiver signal processing. The timing generator 312 may comprise suitable logic, circuitry and/or code that may be enabled to generate timing signals for RS extraction, rs_strb, and slot timing, slot_strb. The signal slot_strb may be used to control FFT timing and frequency in the buffering block 330, for example. The module or circuit 314 may comprise suitable logic, circuitry and/or code that may be enabled to extract the RS symbols from the FFT module or circuit 320 output.

The channel estimation module or circuit 316 may comprise suitable logic, circuitry and/or code that may be enabled to estimate the wireless channel response for RS symbols, which may be desirable for receiver operations. The receiver operations module or circuit (RXCVR) 318 may comprise suitable logic, circuitry and/or code that may be enabled to measure and/or verify performance during receiver operations. The fast Fourier-transform (FFT) module or circuit 320 may comprise suitable logic, circuitry and/or code that may be enabled to generate a Fast Fourier Transform for an input signal. The buffering module or circuit 330 may comprise suitable logic, circuitry and/or code that may be enabled to interface with, for example, the FFT engine. The buffering module or circuit 330 may assist in dedicated processes, measurement processes, multimedia broadcast multicast services (MBMS), and/or SSS processing for hopping pattern determination. In some instances, each of the processes may be performed in parallel.

The sample BW filter 332 may comprise suitable logic, circuitry and/or code that may be enabled to filter the signal at its input, and generate an output signal with limited bandwidth. The analog-to-digital (A2D) module or circuit 334 may comprise suitable logic, circuitry and/or code that may be enabled to receive an analog RF-filtered signal and convert it to a digital signal representation at the output, with an arbitrary number of bits. The master timer 336 may comprise suitable logic, circuitry and/or code that may be enabled to provide basic timing and/or frequency functionality in the receiver. In some instances, the master timer 336 may count over 10 ms periods, and may be clocked at 30.72 MHz, for example. The master counter may comprise a slot counter, and a sample counter. The TXCO 338 may comprise suitable logic, circuitry and/or code that may be enabled to generate a variable frequency output signal, as a function of an input signal, for example a voltage.

The common receiver part 342 may receive radio frequency signals, and process these signals. Processing may comprise FFT computation, RS symbol extraction, channel estimation and other receiver signal processing. Some frequency and/or timing aspects of the common receiver part 342 may be controlled by the frequency and timing part 340. For example, the receiver subcarrier/carrier frequency, for example f1 and/or f2 as illustrated in FIG. 2, may be determined via the TXCO 338. Similarly, timing may be controlled via the timing generator 312 via the signal to_accum.

The RS error block 302 may compare the frequency and timing of the RS set input signal with, for example, an input clock signal and may generate a frequency error signal $f_k$, and a timing error signal $e_k$. The RS error block 302 may receive at its input a set of RS symbols, which may be extracted in the RS extraction block 314. The outputs of the RS error block 302 may be communicatively coupled to an RS timing and frequency loop 304.

The RS timing and frequency loop 304 may track frequency and timing offsets, for example $\Delta f$ and $\Delta t_g$ as illustrated in FIG. 2. The RS timing and frequency loop 304 may be enabled to generate a timing output signal to_accum that may be a function of $\Delta t_g$, and a frequency output signal tcxo_accum that may be a function of $\Delta f$. In accordance with an embodiment of the invention, the txco_accum signal, may increase at a rate that is a function of $\Delta f$, and may thus allow information about $\Delta f$ to be communicated to, for example, the TXCO 338, which in turn may control the FFT input window's position in the frequency domain. Similarly, the to_accum signal, may increase at a rate that is a function of $\Delta t_g$, and may thus allow information about $\Delta t_g$ to be communicated to, for example, the timing generator 312, which in turn may control the FFT input window's position in the time domain.

The analog-to-digital (A2D) module or circuit 334 may receive an analog RF-filtered signal and convert it to a digital signal representation at the output, with an arbitrary number of bits. The A2D 334 output may be communicatively coupled to an input of the sample BW filter 332. The sample BW filter 332 may filter the signal at its input, and generate an output signal with limited bandwidth and/or attenuate certain frequency bands. The output of the sample BW filter 332 may be communicatively coupled to a first input of the buffering module or circuit 330. A second input to the buffering module or circuit 330 may be communicatively coupled to the output signal slot_strb from the timing generator 312. The buffering module or circuit 330 may interface with, for example, the FFT engine. The buffering module or circuit 330 may assist in dedicated processes, measurement processes, multimedia broadcast multicast services (MBMS), and/or SSS processing for RS PN sequence determination. In some instances, each of the processes may be performed in parallel. The output of the buffering module or circuit 330 may be communicatively coupled to the FFT module or circuit 320.

The FFT module or circuit 320 may generate a Fast Fourier Transform for an input signal communicatively coupled from the buffering module or circuit 330. Similar to the buffering module or circuit 330, the FFT module or circuit 320 may assist in signal processing for dedicated processes, measurement processes, multimedia broadcast multicast services (MBMS), and/or SSS processing for radio time framing and RS PN sequence determination. A first output of the FFT module or circuit 320 may be communicatively coupled to a first input of the RS extraction module or circuit 314. The RS extraction module or circuit 314 may extract the RS symbols from the FFT module or circuit 320 output. In some instances, it may be desirable to use a generated hopping sequence from the demodulated base station signal and/or pseudo-noise (PN) covering for RS decoding. The RS symbols extracted and output at the RS extraction module or circuit 314 may be communicatively coupled to the input of the frequency and timing part 340, and a channel estimation module or circuit 316. The hopping pattern may be communicated to the RS extraction module or circuit 314 via the rs_hopping_pattern signal on a second input, as illustrated in FIG. 3. The RS extraction module or circuit 314 timing may be controlled via a third input signal rs_strb, communicatively coupled to an output of the timing generator 312.

The timing generator 312 may generate timing and frequency signal for RS extraction, rs_strb, and slot timing, slot_strb. The signal slot_strb may be used to control FFT timing and frequency in the buffering module or circuit 330. The timing generator 312 may generate the output timing signals from a function of the master timer input signal, slot timing (PSS), for timing and frequency corrections and tracking. The master timer input signal may be communicatively coupled to the master timer 336 output. The master timer 336 may provide basic timing and frequency functionality in the receiver. In some instances, the master timer 336 may count over 10 ms periods, and may be clocked at 30.72 MHz, for example. The master counter may comprise a slot counter, and a sample counter. The input to the master timer 336 may be provided by an operating RF crystal, the temperature-controlled crystal oscillator (TXCO) 338, for example. The TXCO 338 may be communicatively coupled to the threshold module or circuit 310 via the txco_accum signal.

The channel estimation module or circuit 316 may estimate the wireless channel response for RS symbols, which may be desirable for receiver operations. The channel estimation output may be communicatively coupled to the RXCVR 318. The RXCVR 318 may measure and/or verify receiver performance functionality.

Figure 4:
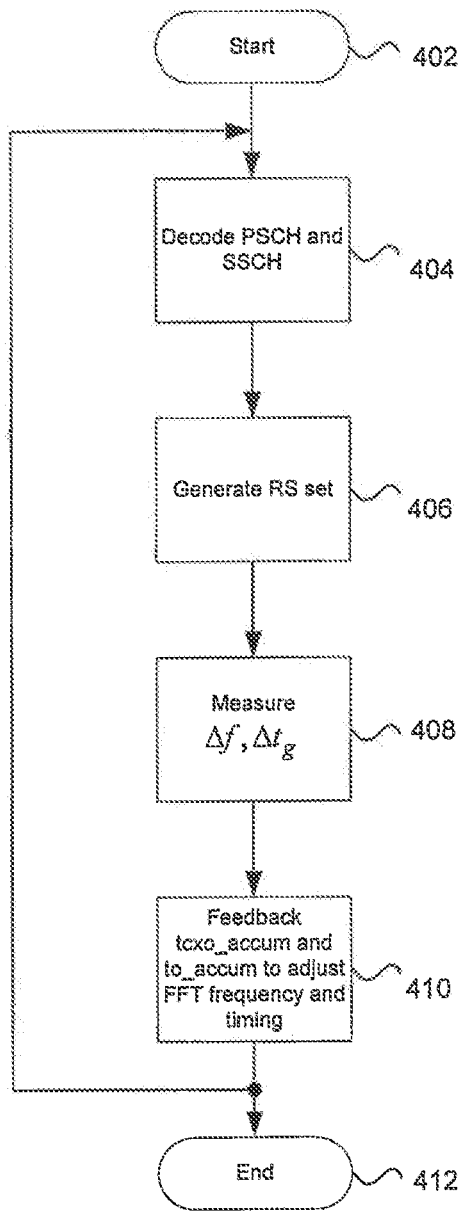
FIG. 4 is a flow chart illustrating an exemplary frequency and timing acquisition and tracking, in accordance with an embodiment of the invention.

FIG. 4 is a flow chart illustrating an exemplary frequency and timing acquisition and tracking, in accordance with an embodiment of the invention. After initialization in step 402, the primary and secondary synchronization signals, PSS and SSS respectively, may be decoded in step 404. The decoding of the PSS and SSS may provide coarse frequency and timing information for frame and slot synchronization, for example. After step 404, the flow chart transitions to step 406, where the FFT block 320, for example, may utilize the frequency and time information to generate an FFT of a received signal. The RS extraction block 314, for example, may utilize the generated FFT to extract an RS set in the RS extraction block 314. This RS set may be communicated to the frequency and timing part 340. After step 406, the flow chart transitions to step 408.

In step 408, the frequency and timing part 340 may track the frequency offset $\Delta f$ and the timing offset $\Delta t_g$ using the RS timing and frequency loop 304 as disclosed with respect to FIG. 3, for example. Since the output signal txco_accum may be generated as a function of $\Delta f$, the txco_accum output signal from the threshold block 310 may carry information about $\Delta f$ to the TXCO 338. Similarly, the output signal to_accum may be generated as a function of $\Delta t_g$, and may thus carry information about $\Delta t_g$ to the timing generator 312, for example. Thus, the output signals txco_accum and to_accum may enable tracking of the carrier frequency and timing, and may enable adjustment of the receiver frequency and timing, for example in the master timer 336 via the TCXO 338, and the timing generator 312. In step 410, the master timer 336 may adjust the frequency based on the input signal txco_accum, and the timing generator 312 may adjust the FFT input window timing. After step 410, the flow chart transitions to step 404. Alternatively, following step 410, the flowchart transitions to step 412, where the flow chart ends.

In accordance with an embodiment of the invention, a method and system for an OFDM joint timing and frequency tracking system may comprise tracking carrier frequency and symbol timing in an Orthogonal Frequency Division Multiplexing (OFDM) signal based on at least a reference symbol set, as described for FIG. 2, for example. A receiver frequency and timing may be adjusted based on the tracked carrier frequency and symbol timing.

The carrier frequency may be tracked by generating an output signal that is a function of a frequency offset $\Delta f$, and the symbol timing may be tracked by generating an output signal that is a function of a guard time $\Delta t_g$. The received OFDM signal may be fast Fourier transformed to generate the reference symbol (RS) set, as described in FIG. 2 and FIG. 3. The receiver frequency and timing may be adjusted coarsely prior to fine adjustment. The coarse receiver frequency and the timing adjustment may be based on processing a primary synchronization signal and a secondary synchronization signal, as described for FIG. 4. The reference symbol set may comprise a plurality of time-frequency slots, which may change according to a hopping pattern that is determined by a base station identifier. The OFDM signal may conform to a Universal Mobile Telecommunications Standards (UMTS) long-term evolution (LTE) signal. The adjustment of the receiver frequency may be controlled via a receiver frequency oscillator (TXCO) 338, and the adjustment of the timing may be controlled via a timing generator 312, for example.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for an OFDM joint timing and frequency tracking system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   tracking a carrier frequency and a symbol timing in an Orthogonal Frequency Division Multiplexing (OFDM) signal based on a reference symbol set;
   coarsely adjusting a receiver frequency and a receiver timing based on the tracked carrier frequency and the tracked symbol timing, wherein the coarse adjustment includes generating a coarse receiver frequency and a coarse timing adjustment based on a primary synchronization signal and a secondary synchronization signal; and finely adjusting the receiver frequency and the receiver timing based on the tracked carrier frequency and the tracked symbol timing.

2. The method according to claim 1, wherein the coarse adjustment is performed prior to the fine adjustment.

3. The method according to claim 1, wherein the reference symbol set comprises:
a plurality of time-frequency slots configured to change according to a time-frequency shift and pseudo-noise sequence that modulates the reference symbol set.

4. The method according to claim 1, further comprising:
Fast Fourier Transforming the OFDM signal to generate the reference symbol set.

5. The method according to claim 1, further comprising:
controlling the coarse and fine adjustment of the receiver frequency via a receiver frequency oscillator.

6. The method according to claim 1, further comprising:
controlling the coarse and fine adjustment of the symbol timing via a timing generator.

7. The method according to claim 1, wherein the tracking of the carrier frequency and symbol timing comprises:
comparing an input clock signal to frequency and timing information extracted from the OFDM signal utilizing the reference symbol set to generate frequency error information and timing error information.

8. The method according to claim 7, wherein the tracking of the carrier frequency comprises:
generating an output signal as a function of a frequency offset, the output signal being generated based on the frequency error information.

9. The method according to claim 7, wherein the tracking of the symbol timing comprises:
generating an output signal as a function of a guard time, the output signal being generated based on the timing error information.

10. The method according to claim 7, wherein the tracking of the carrier frequency comprises:
generating an output signal as a function of a frequency offset, the output signal being generated based on the frequency error information; and
wherein the tracking of the symbol timing comprises:
generating an output signal as a function of a guard time, the output signal being generated based on the timing error information.

11. A system for processing communication signals, the system comprising:
a frequency and timing module configured to track a carrier frequency and a symbol timing in an Orthogonal Frequency Division Multiplexing (OFDM) signal based on a reference symbol set; and
a receiver configured to:
coarsely adjust a frequency and a timing of the receiver based on the tracked carrier frequency and the tracked symbol timing, wherein the coarse adjustment includes generating a coarse receiver frequency and a coarse timing adjustment based on a primary synchronization signal and a secondary synchronization signal; and
finely adjust the frequency and the timing of the receiver based on the tracked carrier frequency and the tracked symbol timing.

12. The system according to claim 11, wherein the receiver is configured to perform the coarse adjustment prior to the fine adjustment.

13. The system according to claim 11, wherein the reference symbol set comprises:
a plurality of time-frequency slots configured to change according to a time-frequency shift and pseudo-noise sequence that modulates the reference symbol set.

14. The system according to claim 11, wherein the receiver comprises:
a Fast Fourier Transform module that is configured to Fast Fourier Transform the OFDM signal to generate the reference symbol set.

15. The system according to claim 11, wherein the receiver comprises:
a receiver frequency oscillator, wherein the receiver is further configured to control the coarse and fine adjustment of the receiver frequency utilizing the receiver frequency oscillator.

16. The system according to claim 11, wherein the receiver comprises:
a timing generator, wherein the receiver is farther configured to control the coarse and fine adjustment of the symbol timing utilizing the timing generator.

17. The system according to claim 11, wherein the frequency and timing module is configured to compare an input clock signal to frequency and timing information extracted from the OFDM signal utilizing the reference symbol set to generate frequency error information and timing error information to track the carrier frequency and the symbol timing.

18. The system according to claim 17, wherein the frequency and timing module is configured to generate an output signal based on the frequency error information, the output signal being a function of a frequency offset.

19. The system according to claim 17, wherein the frequency and timing module is configured to generate an output signal based on the timing error information, the output signal being a function of a guard time.

20. A system for processing communication signals, the system comprising:
a frequency and timing module configured to track a carrier frequency and a symbol timing in an Orthogonal Frequency Division Multiplexing (OFDM) signal based on a reference symbol set; and
a receiver configured to:
generate the reference symbol set and provide the reference symbol set to the frequency and timing module, wherein the reference symbol set includes a plurality of time-frequency slots configured to change according to a time-frequency shift and pseudo-noise sequence that modulates the reference symbol set;
coarsely adjust a frequency and a timing of the receiver based on the tracked carrier frequency and the tracked symbol timing; and
finely adjust the frequency and the timing of the receiver based on the tracked carrier frequency and the tracked symbol timing.

* * * * *